United States Patent [19]
Qiu

[11] Patent Number: 5,535,640
[45] Date of Patent: Jul. 16, 1996

[54] CAM, PAWL AND SECTOR GEAR LOCKING ARRANGEMENT

[75] Inventor: Wanli Qiu, Troy, Mich.

[73] Assignee: General Motors Corporation, Detroit, Mich.

[21] Appl. No.: 328,174

[22] Filed: Oct. 24, 1994

[51] Int. Cl.⁶ ........................................... G05G 5/06
[52] U.S. Cl. ........................... 74/540; 297/367; 74/567; 74/569
[58] Field of Search ................... 74/533, 535, 540, 74/541, 567, 529, 542; 297/367

[56] References Cited

U.S. PATENT DOCUMENTS

| | | | |
|---|---|---|---|
| 3,973,288 | 8/1976 | Pickles | 297/367 X |
| 3,999,247 | 12/1976 | Cremer | 16/146 |
| 4,165,128 | 8/1979 | Srowick et al. | 297/367 |
| 4,233,947 | 9/1980 | Cremer | 297/367 |
| 4,765,681 | 8/1988 | Houghtaling et al. | 297/367 |
| 4,836,608 | 6/1989 | Sugiyama | 297/367 |
| 4,872,726 | 10/1989 | White et al. | 297/367 |
| 4,875,735 | 10/1989 | Moyer et al. | 297/367 |
| 4,946,223 | 8/1990 | Croft et al. | 297/367 |
| 4,995,669 | 2/1991 | Croft | 297/379 |
| 5,154,476 | 10/1992 | Haider et al. | 297/367 |

FOREIGN PATENT DOCUMENTS 2041092  8/1992  Canada .................................. 297/367

*Primary Examiner*—Charles A. Marmor
*Assistant Examiner*—Saul Rodriguez
*Attorney, Agent, or Firm*—Ernest E. Helms

[57] ABSTRACT

A cam, pawl and sector gear locking arrangement useful in vehicle seat adjusters is provided which maintains better engagement over a wider range of positioning of the cam and is more forgiving of misplacement of the cam or the sector gear with respect to the pawl due to build tolerances or wear conditions.

4 Claims, 4 Drawing Sheets

5,535,640

CAM, PAWL AND SECTOR GEAR LOCKING ARRANGEMENT

FIELD OF THE INVENTION

The field of the present invention is that of cam, pawl and sector gear locking assemblies. More particularly, the present invention concerns cam, pawl and sector gear locking assemblies suitable for use in seat adjusters.

BACKGROUND OF THE INVENTION

Cam, pawl and sector gear locking arrangements are well known in manual six-way seat adjusters such as shown in Bauer et al, U.S. Pat. No. 4,190,225 and in recliner seat adjusters as shown in Bosworth et al, U.S. Ser. No. 08/214,505. In cam, pawl and sector gear locking arrangements, a rotary cam is torsionally biased to push a pivotal pawl against a sector gear to selectively lock a seat adjuster in a given position. In an ideal situation, a line drawn from a pivotal axis of the cam to the center line of the gear will intersect with a point of contact of the cam with the pivotal pawl. When the ideal situation exists, there is the greatest resistance of the cam being pivoted out of position to inadvertently release the seat adjuster. Due to wear of the cam surface, the point of contact of the cam with the sector pawl can change to a non-ideal condition. Also, due to build variations and manufacturing tolerances, if the pivotal axis of the pawl is taken as a reference point, often the cam will be dislocated away from the pawl or the sector gear may be dislocated away from the pawl, thereby causing the cam to contact the pawl in a poor position.

SUMMARY OF THE INVENTION

The present invention provides a cam, pawl and sector gear locking arrangement which maintains better engagement over a wider range of positioning of the cam and is more forgiving of misplacement of the cam or the sector gear with respect to the pawl due to build tolerances or wear conditions.

BRIEF DESCRIPTION OF THE DRAWINGS AND TABLE

Figure 3:
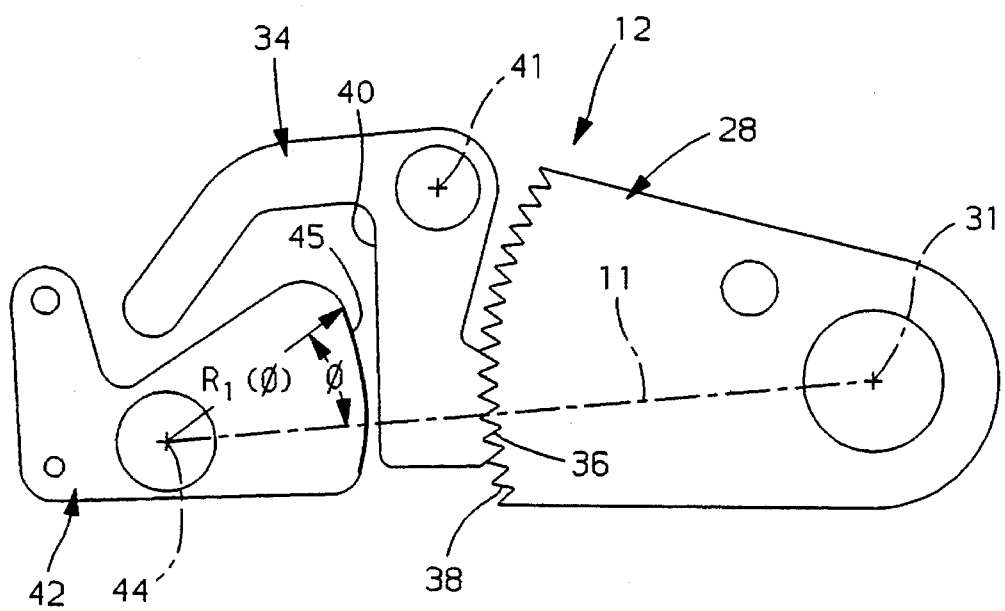
FIG. 3 is a cam, pawl and gear locking arrangement as shown in FIG. 2, illustrating the changes coming about due to displacement of the cam away from the pawl.
Figure 4:
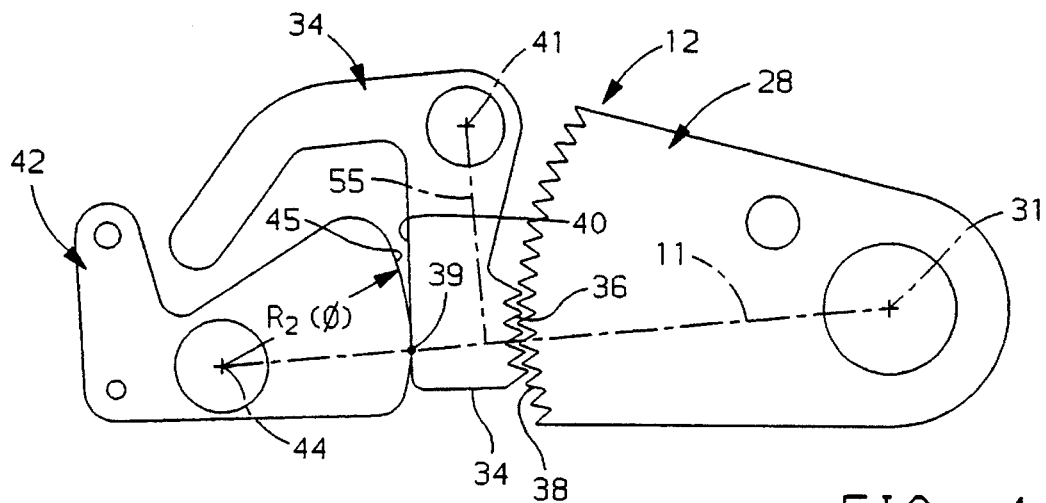
FIG. 4 is a cam, pawl and gear locking arrangement illustrating an arrangement wherein the sector gear is displaced from the pawl.

Table 1 shows values of the radius (R) of a cam surface as a function of an equation developed for the situations of FIGS. 3 and 4.

DESCRIPTION OF THE PREFERRED EMBODIMENT

Figure 1:
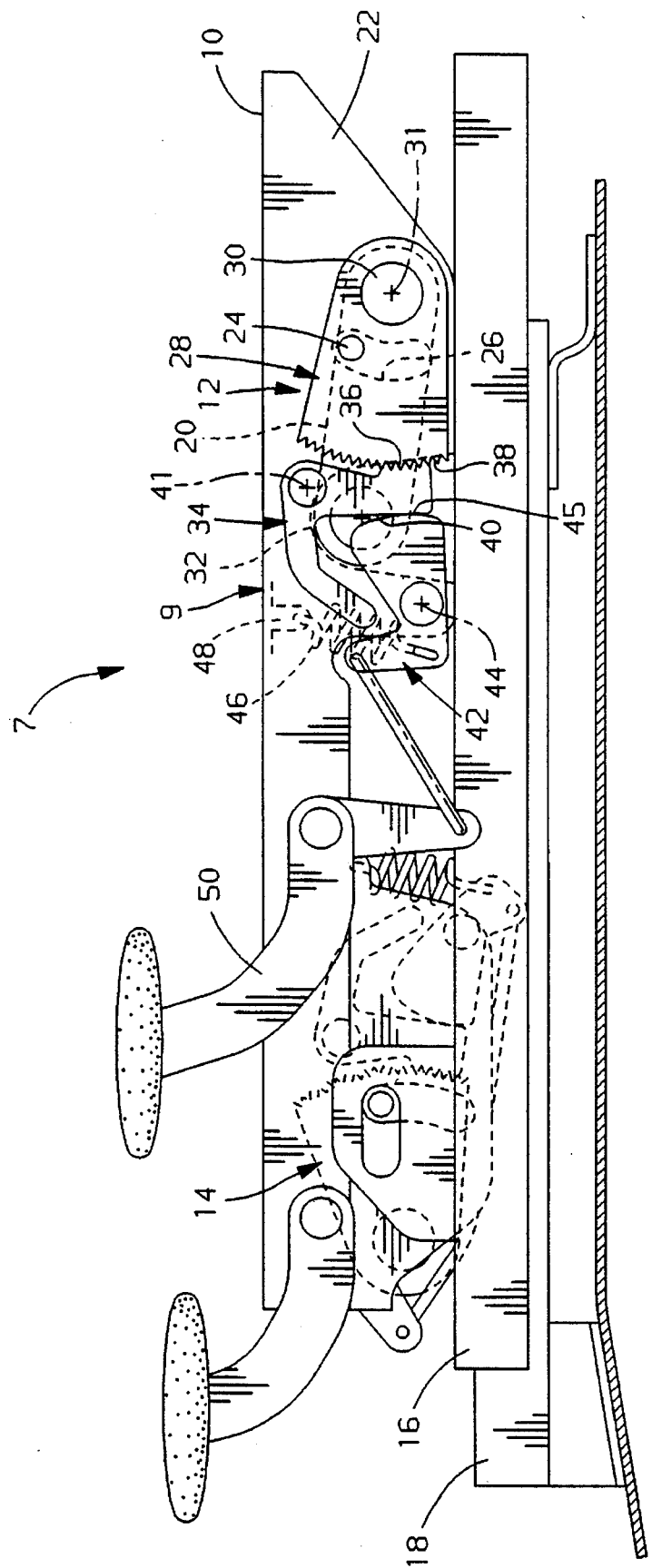
FIG. 1 is a side elevational view of a six-way manual seat adjuster according to the present invention with the seat removed for clarity of illustration, illustrating a rotational cam, pivotal pawl and sector gear locking arrangement according to the present invention, providing the front and rear vertical adjustment functions of the seat adjuster.
Figure 2:
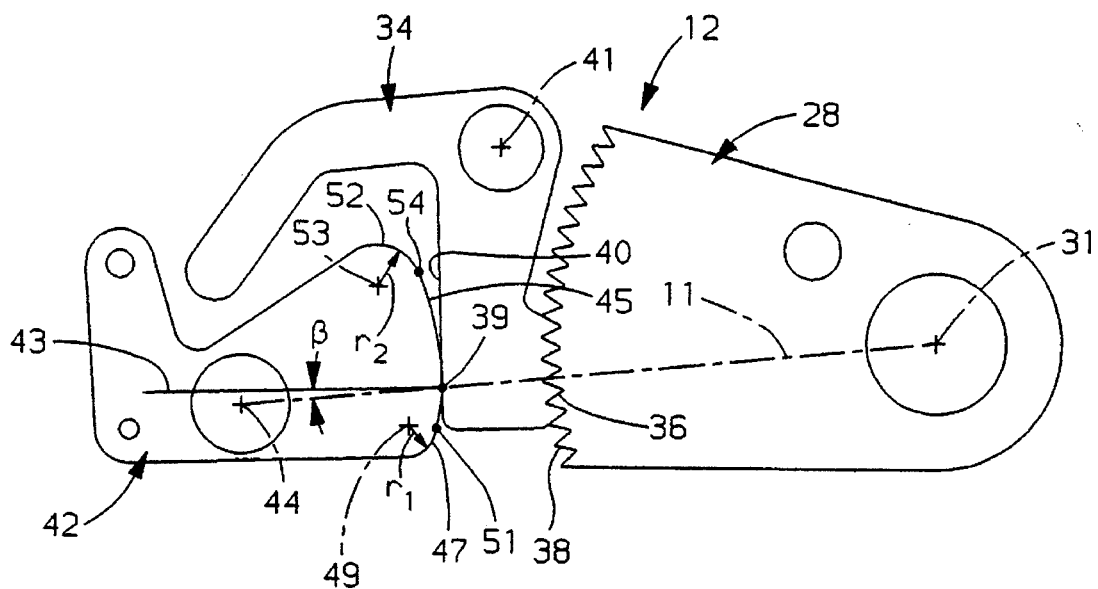
FIG. 2 is a cam, pawl and gear locking arrangement enlarged and taken from FIG. 1.

Referring to FIGS. 1 and 2, the seat adjuster 7 shown is positioned underneath a vehicle seat, which has been removed for clarity of illustration. The seat adjuster has two parallel spaced (inboard and outboard) slider assemblies 9, only one of which is shown. The vehicle seat is connected on top of a platform 10. The seat adjuster 7 is made so that the rear end of the seat may be adjusted up and down by a mechanism 12. Additionally, the front end of the seat may be adjusted up and down by a mechanism 14. The seat adjuster 7 can be adjusted in front and rear positions in a well known fashion by selective positioning of an upper channel 16 on a lower channel 18. The front and rear positioning mechanism is not part of this invention.

The vertical adjustment mechanisms work in essentially identical fashion; therefore, only one mechanism will be explained. The platforms 10 on both inboard and outboard slider assemblies 9 are pivotally connected with pivotal links 20. The pivotal link 20 is positioned on the inboard side of a vertical flange 22 of the platform and has a horizontally projecting pin 24 which projects through a kidney-shaped slot 26 provided in the flange 22 of the platform. The pin 24 also attaches a sector of a gear 28 with the pivotal link 20. The gear sector 28 and the pivotal link 20 are both pivotally joined to the platform by a common pin 30 with an axis 31.

At an opposite end, the pivot link 20 is pivotally attached to a stand 32 which is fixably connected to the upper channel 16 of a front and rear positioning mechanism of the seat adjuster 7.

Pivotally attached to the platform flange 22 is a pivotal pawl 34. The pivotal pawl has one end with gear teeth 36 which project toward teeth 38 of the sector gear. On the opposite end away from the gear teeth of the pawl is a smooth linear surface 40. The pawl also has a pivotal axis 41.

Making contact with the smooth linear surface of the pawl is a cam 42 having a rotational axis 44 mounted to the flange 22 of the platform. The cam 42 has a cam engagement or cam surface 45 to contact the pawl surface 40. The cam 42 is torsionally biased to an engaging position with the pawl surface 40 by a spring 46 connected to the cam 42 and mounted by a mounting flange 48 of the platform. To release the cam 42 from its normal engaging position, there is a release handle and associated linkage 50. When releasing the cam 42, there is typically a counterbalance spring (not shown) to aid in lifting the end of the platform with respect to the upper channel. Typically, the vertical adjust mechanisms 12, 14 will only be on one slider assembly 9 with the other assembly deleting the sector gear, pawl and cam.

Figure 5:
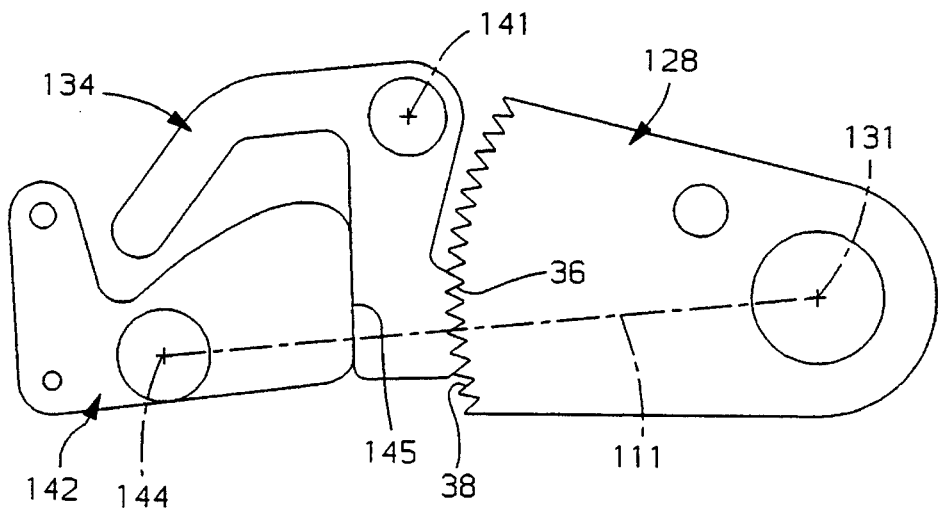
FIG. 5 is a prior art cam, pawl and gear assembly.

Prior to the present invention, the cam 142, pawl 134 and sector gear 128 arrangement resembled that shown in FIG. 5. Any slight misalignment of the parts with respect to one another or in their pivotal axis, or any wear upon the cam surface would allow the cam/pawl contact surface to be out of alignment with a line 111 drawn through the rotary axis 144 of the cam and the axis 13 1 of the sector gear, thereby allowing a greater chance of the cam 142 being pivoted (counter clockwise) out of position. To counterbalance this feature, typically a fairly stiff biasing spring (not shown in FIG. 5) had to be utilized.

Figure 6:
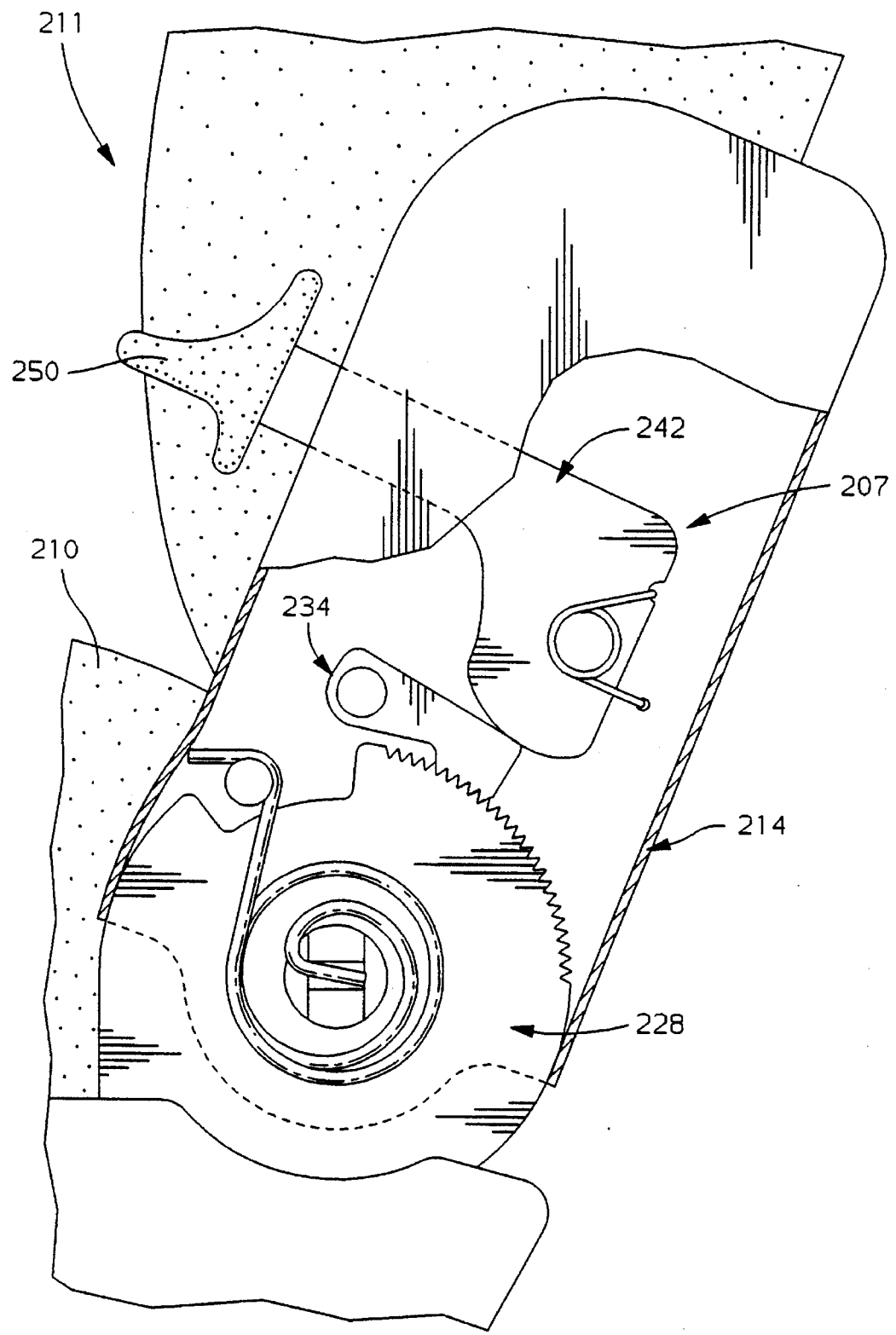
FIG. 6 illustrates the present invention of a cam, pawl and locking gear assembly utilized in the recliner adjuster similar to that described in the aforementioned Bosworth et al.

Referring to FIG. 6, the present invention is shown in the environment of a reclining seatback seat adjuster mechanism 207. (Major portions of the adjuster mechanism not concerning the reclining of a seatback have been deleted for clarity of illustration.) A sector gear 228 is fixably connected to a seat bun 210 of the vehicle seat 211. Pivoted along the main axis of the sector gear in a pivotal fashion is a seatback assembly 214. Pivoted to the seatback assembly 214 is the cam 242 and the pawl 234. A lever 250 is utilized to manipulate the cam to a release position, thereby allowing movement of the seatback 214 with respect to the seat bun 210.

Referring to FIGS. 2, 3 and 4, the cam, pawl and sector gear locking mechanism of the present invention provides three desirable features: (1) the cam surface 45 profile is designed so that full pawl/sector gear engagement can be achieved regardless of design tolerances, build variations and wear in the mechanism; (2) when pawl/sector gear engagement is achieved, the contact point 39 between the cam 42 and the pawl 34 is always approximately on a line connecting the rotary axis 44 of the cam and the axis 31 of the sector gear; and (3) the angle β between a normal line 43 intersecting at the cam/pawl contact point 39 and the line 11 connecting the axes of the cam and the sector is selected to be less than a critical angle, α, of inclination of the materials used to fabricate the cam 42 and the pawl 34 which is related to the coefficient of friction of the materials, μ, by tan α = μ.

The advantages of having the above three features are the cam profile 45 will compensate for design tolerances, build variations and wear in the locking arrangement to achieve full pawl/sector gear engagement, and the pawl/sector gear engagement will not be reversed under increased load between the pawl and the sector gear.

The design provides the advantages through a mathematically determined cam surface profile 45 and the pawl 34 that has an inclined surface 40 to contact the cam, the two key elements of the invention. The pawl has an inclined surface 40 facing the cam. The angle of inclination, β, is an angle smaller than the critical angle of inclination, α. The critical angle is determined by α = arctan μ, where μ is the coefficient of friction between the pawl and the cam. The significance of β being smaller than α is that the result of the contact force and the friction force will pass through the rotary axis 44 of the cam and will not cause a moment tending to rotate the cam 42 regardless of the magnitude of the contact force.

At one end of cam surface profile 45 there is a small segment 47 with a constant radius ($r_1$) from point 49. The segment 47 should smoothly connect to curve 45 with the transition point 51 below the contact point 39 in an ideal condition. At the other end of the cam surface profile, there is another segment 52 with a constant radius ($r_2$) from point 53 and the transition point 54. In an embodiment not shown, segment 52 has an added portion to aid in providing continued locking in a crash situation. As mentioned previously, as the cam 42 rotates in a clockwise manner, the contact point 39 should remain on the line 11. To maintain contact point 39 on the line 11, one must account for clearance between the pins which mount the cam 42, the pawl 34 and the sector gear 28 and their bearing mounts; mislocation of the pivotal axis 31 of the sector gear to the pivotal axis 41 of the pawl; and displacement of the cam rotary axis 44 to the pivotal axis 41. Additionally, design tolerances as well as build variations and wear may cause the arrangement 12 to deviate from the design intent. The design variability pattern may look like FIG. 3 (with a gap between the cam 42 and the pawl 34) or FIG. 4 (with a gap between the pawl 34 and the sector gear 28), or a combination of the two.

The challenge is to have one cam profile design that consistently achieves full pawl/sector gear engagement with the contact point 39 in line and the contact angle β less than the critical angle of inclination regardless of the design variability of the gaps. This invention describes a technique to produce such a cam profile, which will automatically be expressed with a curve R(φ) in the polar coordinate system at the pivot axis 44 of the cam, where φ is the angular coordinate measured counterclockwise from line 11.

For the situation depicted in FIG. 3, the curve R(φ) is dictated by $$\frac{dR}{Rd\phi} = \tan \beta$$

The solution of the equation is $$R_1(\phi) = (44\text{-}39)\cdot\exp(\phi\tan\beta) = R(0)\cdot\exp(\phi\tan\beta).$$

No matter what size the gap is, the contact point at full engagement will always be in line and the contact angle will always be equal to β.

For the situation depicted in FIG. 4 wherein the sector gear 28 is displaced, the curve R(φ) is dictated by $$\frac{dR}{Rd\phi} = \tan\beta - \frac{R-R(0)}{EF} \approx \beta - \frac{R-R(0)}{EF}$$

(for β < 0.2)

EF = the distance between the pivotal axis 41 of the pawl and the line 11 shown as the length of line 55 in FIG. 4.

The solution of the above equation is $$R_2(\phi) = R(0) \cdot \frac{\left[\beta + \frac{R(0)}{EF}\right] \cdot \exp\left\{\left[\beta + \frac{R(0)}{EF}\right]\cdot\phi\right\}}{\beta + \frac{R(0)}{EF} \cdot \exp\left\{\left[\beta + \frac{R(0)}{EF}\right]\cdot\phi\right\}} = R(0) \cdot \frac{\beta + \frac{R(0)}{EF}}{\beta \cdot \exp\left\{-\left[\beta + \frac{R(0)}{EF}\right]\cdot\phi\right\} + \frac{R(0)}{EF}}.$$

No matter what size the gap is, the contact point at full engagement will always be in line and the contact angle will be smaller than a.

It will be shown later in an example that numerically $R_1(\phi)$ and $R_2(\phi)$ are actually very close to each other. Because design tolerances, build variations and wear pattern manifest themselves as a combination of gaps shown in FIGS. 3 and 4, the cam profile between point 51 and point 54 (FIG. 2) is defined in the general form:

$$R(\phi) = A_1 R_1(\phi) + A_2 R_2(\phi),$$

what $A_1$ is the weight factor for the cam/pawl gap and $A_2$ is the weight factor for the pawl/sector gear gap. The two weight factors satisfy $A_1 + A_2 = 1$. If neither variability pattern is dominant, it is suggested that $A_1 = A_2 = \frac{1}{2}$ be used, i.e., $$R(\phi) = \tfrac{1}{2}R_1(\phi) + \tfrac{1}{2}R_2(\phi).$$

As a result of this assumption, the contact point at full engagement will be close to but not exactly on the line connecting the pivots of the cam and the sector. Also, the contact angle will not be more than β.

In an actual design, the size of the cam is always subject to space constraints. As a result, the mathematical expression of the cam profile will need to be truncated at both ends, i.e., $R = R(\phi)(\phi_1 \leq \phi \leq \phi_2)$. For most applications, $\phi_1 \geq -10°$ and $\phi_2 \leq 40°$.

The above design concept allows the parts to be designed without concern for design tolerances, build variations and wear. The manufactured locking mechanism based on the concept will compensate for variability.

EXAMPLE

Figure 7:
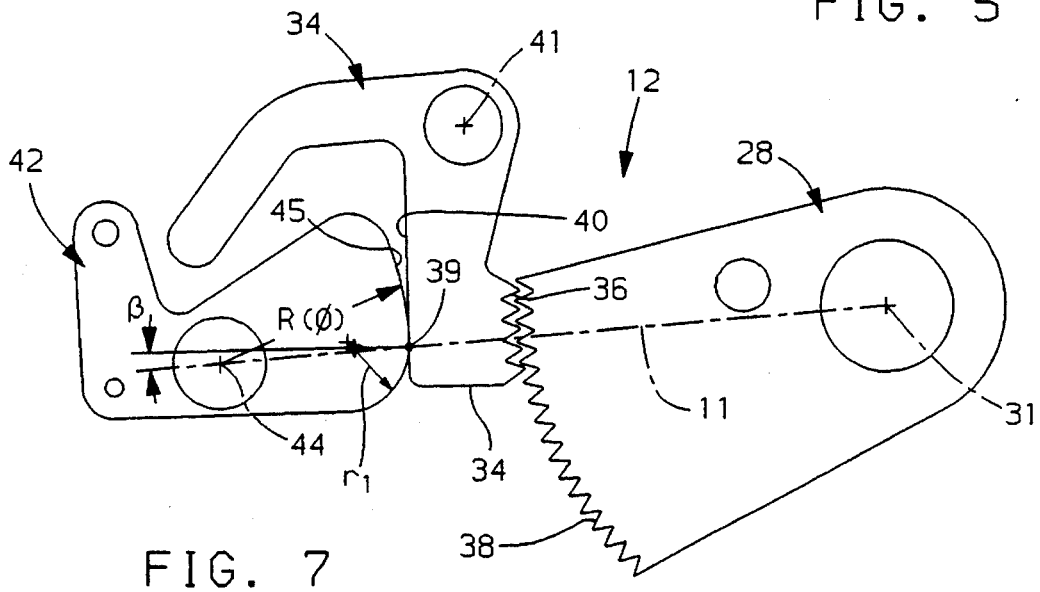
FIG. 7 is a cam, pawl and gear locking arrangement similar to that shown in FIG. 2.

FIG. 7 shows an example similar to that shown in FIG. 2. FIG. 7 shows a lubricated steel pawl-steel sector gear locking arrangement in the fully engaged position by design intent. For steel-on-steel contact with lubrication, the coefficient of friction, μ, is around 0.08. The critical angle, therefore, is $\alpha$ = arctan (0.08) ~ 0.08 (radians) ~ 4.57°. For this example, angle β is set as 3° or 0.0524 radians. Thus, the pawl has an inclined straight line surface 40 facing the cam 42 with an angle of inclination of 3°. The intersection point 39 between the inclined pawl surface 40 and line 11 is the intended contact point. For the selected width of the pawl, the distance between the axis 44 of the cam 42 to the point 39 is 30.985 mm.

The cam profile used consists of two smoothly connected curves, $C_1$ and $C_2$, with point 39 as the transition point. Curve $C_1$ is an arc with its center at point 49 and a radius of 8 mm. Curve $C_2$ is expressed in $R(\phi)$, where $\phi$ is the angular coordinate in radians measured from line 44-39. With the distance between axis 41 and line 11 being 32 mm in this example, curve $C_2$ is $R(\phi) = \frac{1}{2}R_1(\phi) + \frac{1}{2}R_2(\phi)$, ($\phi$ in radians) where $R_1(\phi) = 30.985 \cdot \exp(0.0524\phi)$ and $$R_2(\phi) = \frac{603.55}{\exp\{-1.0207 \cdot \phi\} + 18.479}$$

Table 1 tabulates $R_1(\phi)$, $R_2(\phi)$ and $R(\phi)$ as functions of $\phi$ in degrees.

TABLE 1

$R_1(\phi)$, $R_2(\phi)$ and the Difference as Functions of $\phi$
(R in millimeters, $\phi$ in degrees)

| φ | $R_1(\phi)$ | $R_2(\phi)$ | $R_1(\phi)$–$R_2(\phi)$ |
| --- | --- | --- | --- |
| 0 | 30.985225 | 30.985225 | 0.0000000 |
| 1 | 31.013579 | 31.013315 | 0.0002641 |
| 2 | 31.041960 | 31.040960 | 0.0010005 |
| 3 | 31.070367 | 31.068164 | 0.0022030 |
| 4 | 31.098800 | 31.094934 | 0.0038653 |
| 5 | 31.127258 | 31.121277 | 0.0059813 |
| 6 | 31.155743 | 31.147198 | 0.0085449 |
| 7 | 31.184254 | 31.172704 | 0.0115503 |
| 8 | 31.212791 | 31.197799 | 0.0149913 |
| 9 | 31.241354 | 31.222492 | 0.0188621 |
| 10 | 31.269943 | 31.246786 | 0.0231570 |
| 11 | 31.298558 | 31.270688 | 0.0278702 |
| 12 | 31.327200 | 31.294204 | 0.0329959 |
| 13 | 31.355868 | 31.317339 | 0.0385285 |
| 14 | 31.384562 | 31.340099 | 0.0444625 |
| 15 | 31.413282 | 31.362489 | 0.0507924 |
| 16 | 31.442028 | 31.384515 | 0.0575127 |
| 17 | 31.470801 | 31.406183 | 0.0646181 |
| 18 | 31.499600 | 31.427497 | 0.0721033 |
| 19 | 31.528426 | 31.448463 | 0.0799629 |
| 20 | 31.557278 | 31.469086 | 0.0881918 |
| 21 | 31.586156 | 31.489371 | 0.0967848 |
| 22 | 31.615061 | 31.509324 | 0.1057370 |
| 23 | 31.643992 | 31.528948 | 0.1150433 |

TABLE 1-continued $R_1(\phi)$, $R_2(\phi)$ and the Difference as Functions of $\phi$
(R in millimeters, $\phi$ in degrees)

| φ | $R_1(\phi)$ | $R_2(\phi)$ | $R_1(\phi)$–$R_2(\phi)$ |
| --- | --- | --- | --- |
| 24 | 31.672949 | 31.548251 | 0.1246987 |
| 25 | 31.701934 | 31.567235 | 0.1346984 |
| 26 | 31.730944 | 31.585907 | 0.1450375 |
| 27 | 31.759981 | 31.604270 | 0.1557114 |
| 28 | 31.789045 | 31.622330 | 0.1667152 |
| 29 | 31.818136 | 31.640091 | 0.1780444 |
| 30 | 31.847252 | 31.657558 | 0.1896944 |

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A cam, pawl and sector gear selective locking arrangement for an adjuster assembly for a vehicle seat selectively retaining the position of a first member of the vehicle seat adjuster assembly with respect to a second member of the vehicle seat adjuster assembly comprising:

a rotary cam having a first rotary axis fixed with respect to one of the seat members, the cam being rotatively torsionally biased, and the cam having a camming surface;

a pivotal pawl having a pivotal axis fixed with respect to one of the seat adjuster members, the pawl having a first surface for contact with the cam and a generally opposing surface with gear teeth; and a sector gear having a fixed axis with respect to the first seat adjuster member for selective engagement with the gear teeth of the pawl to set the position of the first seat adjuster member with respect to the second seat adjuster member, and wherein a line taken perpendicular to a line connecting the rotary axis of the cam and the axis of the sector gear makes an angle β with respect to the first surface of the pawl, the angle β being less than a critical angle of inclination between the cam and pawl and wherein the distance from the cam rotational axis to the camming surface (R) equals R(0) when angle φ is equal to 0 and wherein R is defined as a function of angle φ:

$$R = R(0) \times \exp(\phi \tan \beta)$$

wherein φ is equal to the angle between the line connecting the rotary axis of the cam and the axis of the sector gear and R and wherein the cam camming surface makes contact with the pawl first surface generally along the line connecting the rotary axis of the cam and the axis of the sector gear.

2. A cam, pawl and sector gear selective locking arrangement for an adjuster assembly for a vehicle seat selectively retaining the position of a first member of the vehicle seat adjuster assembly with respect to a second member of the vehicle seat adjuster assembly comprising:

a rotary cam having a first rotary axis fixed with respect to one of the seat members, the cam being rotatively torsionally biased, and the cam having a camming surface;

a pivotal pawl having a pivotal axis fixed with respect to one of the seat adjuster members, the pawl having a first surface for contact with the cam and a generally opposing surface with gear teeth; and a sector gear having a fixed axis with respect to the first seat adjuster member for selective engagement with the gear teeth of the pawl to set the position of the first seat adjuster member with respect to the second seat adjuster member, and wherein a line taken perpendicular to a line connecting the rotary axis of the cam and the axis of the sector gear makes an angle $\beta$ with respect to the first surface of the pawl, the angle $\beta$ being less than a critical angle of inclination between the cam and pawl and wherein the distance from the cam rotational axis to the camming surface (R) equals R(0) when an angle $\phi$ is equal to 0 and wherein R is defined as a function of angle $\phi$:

$$R = R(0) \times \frac{\beta + R(0)/EF}{\beta \times \exp\left[-[\beta + R(0)/EF] \times \phi\right] + R(0)/EF}$$

wherein $\phi$ is equal to an angle between the line connecting the rotary axis of the cam and the axis of the sector gear and R, and EF equals the distance from the pivotal axis of the pawl and the line connecting the rotary axis of the cam and the axis of the sector gear and wherein the cam camming surface makes contact with the pawl first surface generally along the line connecting the rotary axis of the cam and the axis of the sector gear.

3. A cam, pawl and sector gear selective locking arrangement for an adjuster assembly for a vehicle seat selectively retaining the position of a first member of the vehicle seat adjuster assembly with respect to a second member of the vehicle seat adjuster assembly comprising:

a rotary cam having a first rotary axis fixed with respect to one of the seat members, the cam being rotatively torsionally biased, and the cam having a camming surface;

a pivotal pawl having a pivotal axis fixed with respect to one of the seat adjuster members, the pawl having a first surface for contact with the cam and a generally opposing surface with gear teeth; and a sector gear having a fixed axis with respect to the first seat adjuster member for selective engagement with the gear teeth of the pawl to set the position of the first seat adjuster member with respect to the second seat adjuster member, and wherein a line taken perpendicular to a line connecting the rotary axis of the cam and the axis of the gear makes an angle $\beta$ with respect to the first surface of the pawl, the angle $\beta$ being less than a critical angle of inclination between the cam and pawl and wherein the distance from the cam rotational axis to the camming surface (R) equals R(0) when an angle $\phi$ is equal to 0 and wherein R is defined as a function of rotation of angle $\phi$ $$A1\,[R(0) \times \exp(\phi \tan \beta)] + A2\,R(0) \times \frac{\beta + R(0)/EF}{\beta \times \exp\left[-[\beta + R(0)/EF] \times \phi\right] + R(0)/EF}$$

wherein $\phi$ is equal to an angle between the line connecting the rotary axis of the cam and the axis of the sector gear and R, and EF equals the distance from the pivotal axis of the pawl and the line connecting the rotary axis of the cam and the axis of the sector gear, and $A1 + A2 = 1$ and wherein the cam camming surface makes contact with the pawl first surface generally along the line connecting the rotary axis of the cam and the axis of the sector gear.

4. A cam, pawl and sector gear selective locking arrangement as described in claim 3 wherein $A_1$ equals $A_2$.

* * * * *